US012080258B2

(12) United States Patent
Wisniewski et al.

(10) Patent No.: US 12,080,258 B2
(45) Date of Patent: Sep. 3, 2024

(54) IMAGE DELIVERY OPTIMIZATION

(71) Applicant: SmartFrame Technologies Limited, London (GB)

(72) Inventors: Artur Wisniewski, Cracow (PL); Michal Pasternak, Cracow (PL); Tomasz Borys, Cracow (PL); Patrick Krupa, Berlin (DE)

(73) Assignee: SMARTFRAME TECHNOLOGIES LIMITED, London (GB)

( * ) Notice: Subject to any disclaimer, the term of this patent is extended or adjusted under 35 U.S.C. 154(b) by 0 days.

(21) Appl. No.: 17/278,080

(22) PCT Filed: Sep. 19, 2019

(86) PCT No.: PCT/GB2019/052638
§ 371 (c)(1),
(2) Date: Mar. 19, 2021

(87) PCT Pub. No.: WO2020/058718
PCT Pub. Date: Mar. 26, 2020

(65) Prior Publication Data
US 2021/0350770 A1    Nov. 11, 2021

(30) Foreign Application Priority Data
Sep. 19, 2018   (GB) ..................................... 1815270

(51) Int. Cl.
*G09G 5/373*  (2006.01)
*G06T 3/40*  (2024.01)
(52) U.S. Cl.
CPC ............... *G09G 5/373* (2013.01); *G06T 3/40* (2013.01)

(58) Field of Classification Search
CPC .................................. G09G 5/373; G06T 3/40
See application file for complete search history.

(56) References Cited

U.S. PATENT DOCUMENTS 9,134,948 B1\*   9/2015   Harnish ................ G06F 3/1415
2009/0317020 A1   12/2009   Gerhard et al.
(Continued)

FOREIGN PATENT DOCUMENTS

GB          2374773 A       10/2002
GB          2528274 A        1/2016
(Continued)

OTHER PUBLICATIONS

Great Britain Search Report for Great Britain Application No. 1815270.2, Mar. 11, 2019, (5 pages), Intellectual Property Office, South Wales, United Kingdom.
(Continued)

*Primary Examiner* — Sing-Wai Wu
*Assistant Examiner* — Khoa Vu
(74) *Attorney, Agent, or Firm* — Alston & Bird LLP

(57) ABSTRACT

A method for the display of an image in a display area, the display area having a pixel density, the image being stored on a server in a plurality of versions, each version of the image having a respective image size, the method comprising: detecting the pixel density of the display area; determining a first version of the image to request from the server based on the pixel density of the display area, the first version of the image having a first image size; requesting the first version of the image; receiving the first version of the image; and displaying the first version of the image in the display area.

13 Claims, 2 Drawing Sheets

(56) References Cited

U.S. PATENT DOCUMENTS

| | | | | |
|---|---|---|---|---|
| 2014/0281926 A1* | 9/2014 | Brenneman | ......... | G06F 16/9577 |
| | | | | 715/238 |
| 2016/0246561 A1* | 8/2016 | Lünnemann | .......... | G06F 3/1454 |
| 2016/0328421 A1* | 11/2016 | Sarratori | ............... | G06F 16/285 |
| 2018/0239745 A1* | 8/2018 | Basta | .................... | G06F 40/143 |
| 2020/0111401 A1* | 4/2020 | Zhao | .................... | G09G 3/2003 |

FOREIGN PATENT DOCUMENTS

| WO | WO-2007/109054 A1 | 9/2007 |
|---|---|---|
| WO | WO-2017/051152 A1 | 3/2017 |
| WO | WO-2017/140939 A1 | 8/2017 |

OTHER PUBLICATIONS

International Searching Authority, International Search Report and Written Opinion for International Application No. PCT/GB2019/052638, Jan. 2, 2020, (10 pages), European Patent Office, Rijswijk, Netherlands.

Summons to Attend Oral Proceedings Pursuant to Rule 115(1) EPC for European Patent Application No. 19778604.9, dated Jul. 17, 2023, (8 pages), European Patent Office, Munich, Germany.

Smus, Boris. "High DPI Images for Variable Pixel Densities." *HTML5 Rocks*, Aug. 22, 2012, pp. 1-15, XP055499458, [Retrieved from the Internet Aug. 13, 2018] <URL: https://www.html5rocks.com/en/mobile/high-dpi/>.

Portis, Eric. "Srcset and Sizes", *Eric Portis*, Mar. 24, 2014, pp. 1-29, XP093060187, [Retrieved from the Internet Jul. 3, 2023] <URL: https://ericportis.com/posts/2014/srcset-sizes/#footnote-1>.

\* cited by examiner

IMAGE DELIVERY OPTIMIZATION

CROSS REFERENCE TO RELATED APPLICATIONS

This application is a National Stage Application, filed under 35 U.S.C. § 371, of International Application No. PCT/GB2019/052638, filed Sep. 19, 2019, which international application claims priority to and the benefit of Great Britain Application No. 1815270.2, filed Sep. 19, 2018; the contents of both of which as are hereby incorporated by reference in their entireties.

BACKGROUND

Related Field

This invention relates to a method for the display of an image in a display area.

Related Art

It is increasingly common for media files, such as image files, video files and music files, to be shared over computer networks, in particular the internet. Computer networks, and the internet in particular, have made it easier to share such media files. In the case of image files, these may be displayed on a wide range of devices such as desktop computers, tablet devices and phone devices. Each of these devices may have a different type of connection to the internet. For instance, a desktop computer may have a wired link to the internet, a tablet device may connect via a wireless link such as Wi-Fi, and a phone device may connect via a wireless link such as a cellular network. Each of these connections may have a different maximum download speed associated with them. In addition, there may be a cap on the amount of data that can be downloaded over the connection in a given time period such as a month.

Each of these devices may also have a different resolution display screen and/or a different size of display screen. This may alter the way in which image files should be displayed on the screen to give maximum quality to the display of the image file. A standard approach is to make the image file available in a size large enough that it can be rescaled by the device to the appropriate size based on the particular properties of the display screen of that device. Such a methodology means that the image is likely to be displayed acceptably on a wide range of devices. However, it has the disadvantage that the device has to process the image before displaying it, which on some devices with limited processing power may be inefficient. In addition, downloading a large version of the image can be inefficient and/or costly depending on the connection that the device uses to connect other computer networks.

It would therefore be desirable if there was an improved method of the delivery and display of an image on a display screen of a device.

BRIEF SUMMARY

According to a first aspect of the present invention there is provided a method for the display of an image in a display area, the display area having a pixel density, the image being stored on a server in a plurality of versions, each version of the image having a respective image size, the method comprising: detecting the pixel density of the display area; determining a first version of the image to request from the server based on the pixel density of the display area, the first version of the image having a first image size; requesting the first version of the image; receiving the first version of the image; and displaying the first version of the image in the display area.

According to a second aspect of the present invention, there is provided a method for the display of an image in an image area of a display area, the image area having a logical dimension and the display area having a pixel density, the image being stored on a server in a plurality of versions, each version of the image having a respective image size, the method comprising: detecting the pixel density of the display area; determining a first version of the image to request from the server based on the pixel density of the display area, the first version of the image having a first image size, wherein determining a first version of the image comprises calculating a desired image dimension by multiplying the pixel density of the display area by the logical dimension of the image area; requesting the first version of the image; receiving the first version of the image; and displaying the first version of the image in the display area.

The image may be displayed in an image area of the display area, and determining a first version of the image to request from the server may be based on a logical dimension of the image area. Determining a first version of the image to request from the server may comprise determining a desired image dimension using the pixel density and the logical dimension and determining a first version of the image to request from the server based on the desired image dimension. The desired image dimension may be calculated by multiplying the pixel density of the display area by the logical dimension of the image area. Determining a first version of the image to request from the server may comprise selecting, from the plurality of versions of the image, a version of the image that has an image size with an image dimension equal to the desired image dimension. Determining a first version of the image to request from the server may comprise selecting, from the plurality of versions of the image, a version of the image that has an image size with an image dimension greater than the desired image dimension. Displaying the first version of the image in the display area may comprise resizing the first version of the image to fit the image area. Determining a first version of the image to request from the server may comprise selecting, from the plurality of versions of the image, a version of the image that has an image size with an image dimension greater than the desired image dimension by a predefined factor. The method may comprise calculating the predefined factor as the smaller value of a fixed value and a fraction of the desired image dimension.

The image may be displayed in an image area of the display area, and the method may comprise: determining a change in size of the image area to a new size of the image area; if the new size of the image area is equal to or less than the first image size, resizing the first version of the image to the new size of the image area.

The image may be displayed in an image area of the display area, and the method may comprise: determining a change in size of the image area to a new size of the image area; if the new size of the image area is greater than the first image size, determining a second version of the image to request from the server based on the pixel density of the display area, the second version of the image having a second image size.

A user device may comprise the display area and determining a first version of the image to request from the server may comprise determining a device model and/or device type for the user device and determining a first version of the image to request from the server based on the device model and/or device type. Determining a first version of the image to request from the server based on the device model and/or device type may comprise applying a scaling factor to the desired image dimension, and determining a first version of the image to request from the server based on the scaled desired image dimension.

The image may be processed into the plurality of versions by resizing the image into a plurality of versions of the image that have defined image widths. The image widths may be selected based on a determined use-case for the image supplied by a user.

The display area may be an area of a display screen and the pixel density may be the number of physical pixels of the display area of the display screen that are used to display one logical pixel. The display area may be an area of a browser window and the pixel density of the display area may be a combination of the pixel density of the display screen and the zoom level of the browser window.

If there is no version of the image that matches the desired image dimension, a version of the image that has an image size greater than the desired image dimension may be requested from the server and resized downward to fit the image area. The version of the image that has an image size greater than the desired image dimension may be larger than the desired image dimension by a predefined amount. The version of the image that has an image size greater than the desired image dimension may be the next largest version of the image that is larger than the desired image dimension added to the predefined amount.

BRIEF DESCRIPTION OF THE FIGURES

The present invention will now be described by way of example with reference to the accompanying drawings. In the drawings.

DETAILED DESCRIPTION OF VARIOUS EMBODIMENTS

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The present invention relates to a method for the display of an image in a display area, the display area having a pixel density, the image being stored on a server in a plurality of versions, each version of the image having a respective image size. The method comprises detecting the pixel density of the display area and determining a first version of the image to request from the server based on the pixel density of the display area, the first version of the image having a first image size. The method further comprises requesting the first version of the image; receiving the first version of the image; and displaying the first version of the image in the display area.

Figure 1:
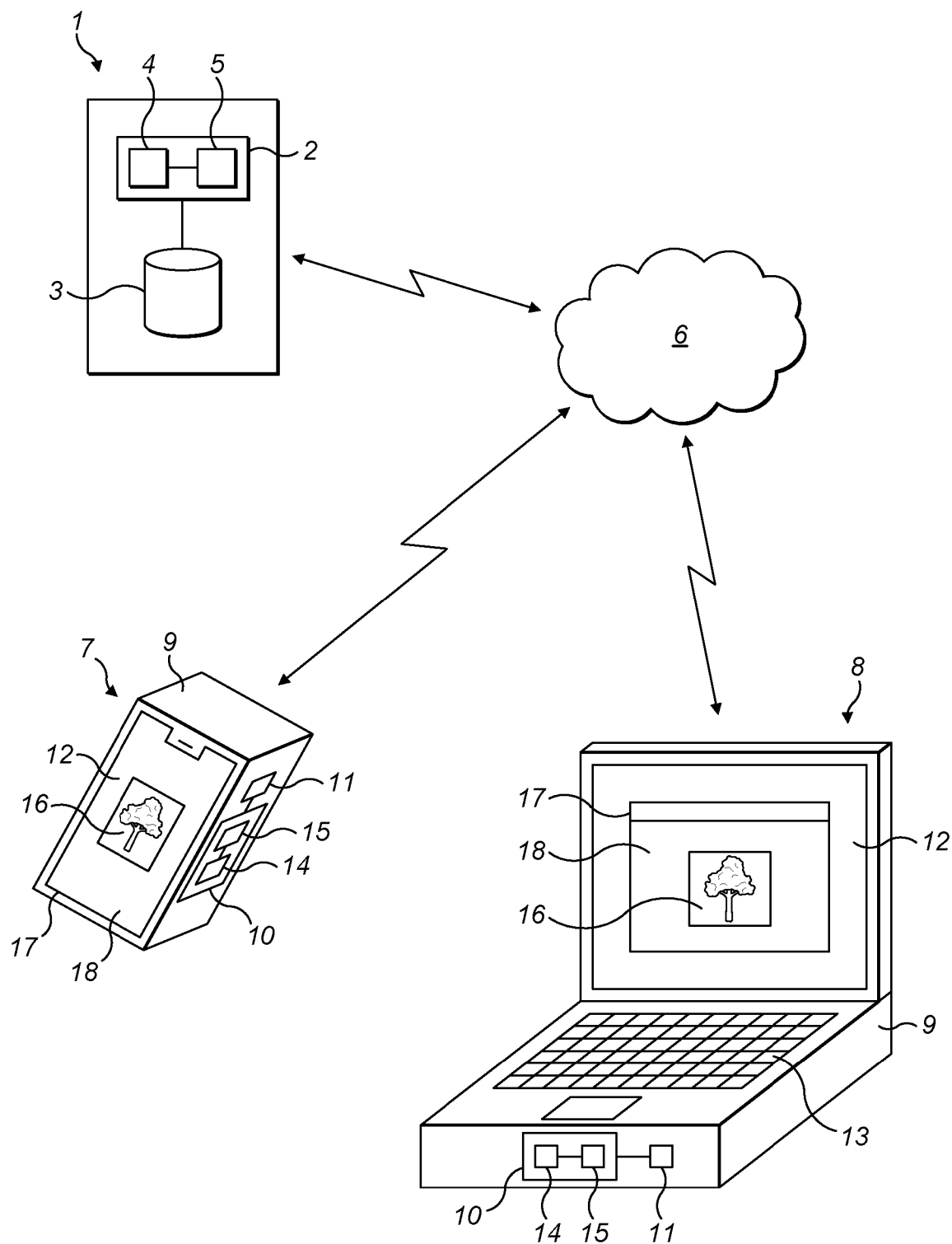
FIG. 1 shows an example system that implements the methods described herein.

FIG. 1 shows an example system that can permit the delivery and display of images in a display area of a device. The system comprises a server 1. It will be appreciated that whilst reference may be made to a single server 10, this server could be part of a cluster of servers or may be a virtual server running in a cloud-based, virtual environment. The server comprises a processing section 2 and a storage section 3. The server 1 is configured to implement methods described herein for processing image files and transmitting them to end-user devices. These methods can be implemented and controlled by the processing section 2. The processing section 2 could perform its methods using dedicated hardware, using a general purpose processor executing software code, or using a combination of the two. A processor 4 executes software code stored in a non-transient way in software memory 5 in order to perform its methods. The processing section can read/write data from/to storage location 3. The storage location 3 may be in the form of a memory. Storage location 3 may comprise non-volatile memory, may be in the form of an array of discrete banks of memory such as hard disks. Whilst shown in FIG. 1 as schematically being part of server 1, the storage location 3 may be separate to server 1 and connected to server 1. The above described image files may be stored in storage location 3. The methods undertaken by server 1 may be spilt across multiple servers. For instance, a first server may receive image files and send them for image processing by a second server. The second server may deliver the processed images to a third server from which an end-user device can access them.

The server 1 may be connected to a computer network 6 to permit the transmission of image files. Computer network 6 may be made up of many network segments that are connected together and so may be a large distributed network such as the internet or another public network.

Also connected to computer network 6 are a plurality of user terminals. User terminals may be a computer, such as a desktop or laptop computer; a portable device, such as a laptop, tablet computer or smartphone; or a smart TV or other device that can connect to remote servers using computer network 6 to access remote content located on servers such as server 1 to permit a user to send and receive information over computer network 6. In the example given in FIG. 1, two user terminals are shown, the first user device 7 being a smartphone 7 with the second user device 8 being a laptop 8. Typically, the user device 7, 8 will be located remote from the server 1 and may well be located in a different country or even on a different continent from the server 1.

As shown in FIG. 1, the first and second devices 7, 8 may comprise a housing 9. The first and second devices 7, 8 comprise a processing section 10 and a memory 11. The first and second devices comprise a user interface constituted by a display 12 and, shown in the case of second device 8, a series of user-actuable switches 13. The display and switches could be combined into a touchscreen device as shown by first device 7. The first and second devices 7, 8 may comprise a wireless communication device for communicating with computer network 6. The first and second devices 7, 8 may comprise a wired communication device for communicating with computer network 6.

The display screen 12 comprises a plurality of pixels. The pixels may be arranged in a grid. The display screen 12 may have a generally rectangular shape with the pixels arranged in a grid within that shape. As shown in FIG. 1, there may be some deviation from that rectangular shape as shown by the screen 12 of the smartphone 7. In any case, the display screen has a shape within which the pixels are arranged in a grid within that shape. The pixels that are present within the display screen 12 may be referred to as physical pixels. This is because they are each capable of physically displaying one pixel of colour on the display screen 12.

The device 7, 8 may be configured to display content on the screen. The content may have a defined number of pixels in each direction that describes the information that is to be displayed by that content. For instance, an image may have an image size which is defined as a grid of colour values in two dimensions, each of those colour values may be described as an image pixel. The device may be configured to display the content on the screen so that one physical pixel is used for each image pixel. In this case, the physical pixel density of the display area would have a value of 1. Alternatively, the device may be configured to display content on the screen so that more than one physical pixel is used for each image pixel. There may not be an integer number of physical pixels used for each image pixel. For instance, the physical pixel density may be 1.5. In this case one and a half physical pixels would be used to display every image pixel of the content. If the physical pixel density is set to 2 then two physical pixels would be used to display every image pixel of the content.

The number of image pixels in each of the two dimensions that the display screen can display due to the physical pixel density may be defined as a number of logical pixels in each dimension. Each logical pixel can be used to display one image pixel of the content to be displayed but may physically be represented by one or more physical pixels depending on the physical pixel density current set by the device.

The first and second devices 7, 8 may be capable of implementing methods described herein display images on display screen 12. These methods may be implemented and controlled by the processing section 10. The processing section 10 could perform its methods using dedicated hardware, using a general purpose processor executing software code, or using a combination of the two. A processor 14 executes software code stored in a non-transient way in software memory 15 in order to perform its methods. The processing section can read/write data from/to memory 11. The memory 11 may be a storage location for data. Memory 11 may comprise non-volatile memory, may be in the form of an array of discrete banks of memory such as hard disks. Whilst shown in FIG. 1 as schematically being part of first and second devices 7, 8, the memory 11 may be separate to first and second devices 7, 8 and respectively connected to first and second devices 7, 8 by some means.

In FIG. 1, user device 8 is shown displaying an image file 16 within an internet browser window 17 using display 12. The internet browser window comprises a display area 18. The internet browser may use display area 18 for the display of webpages that have been accessed over the internet 6 or other computer network 6. The display area 18 may display content items 16 of which the image 16 may be one of them. Those content items 16 may have been received from server 1 over the communications network 6. The content items 16 that are displayed in the display area 18 and the way in which those content items 16 are displayed may be specified by code, stored on server 1, that may be interpreted by a user device 7, 8 to display those content items 16 on display area 18. The code may be in the form of a webpage. Such a webpage may be accessed by the internet browser 17.

First user device 7, analogously to second user device 8, is shown displaying an image file 16. In this case, the browser window 17 fills the display screen 12 of the first user device 7. The display area 18 therefore takes up most, if not all, of the space of display screen 12. The internet browser and display area operate in an analogous way to second user device 8.

Whilst traditionally internet browsers 17 may have been a separate application running on user device 7, 8, it will be appreciated that the term internet browser may encompass a part of another application that displays a webpage within that application. In this case the internet browser itself may be embodied by and/or be part of the other application. The area of the other application may then suitably be the display area 18 of the internet browser. In this way, another application may be capable of interpreting the code, stored on server 1, so as to display those content items 16 on display area 18. At least one of those content items may be an image file 16.

Figure 2:
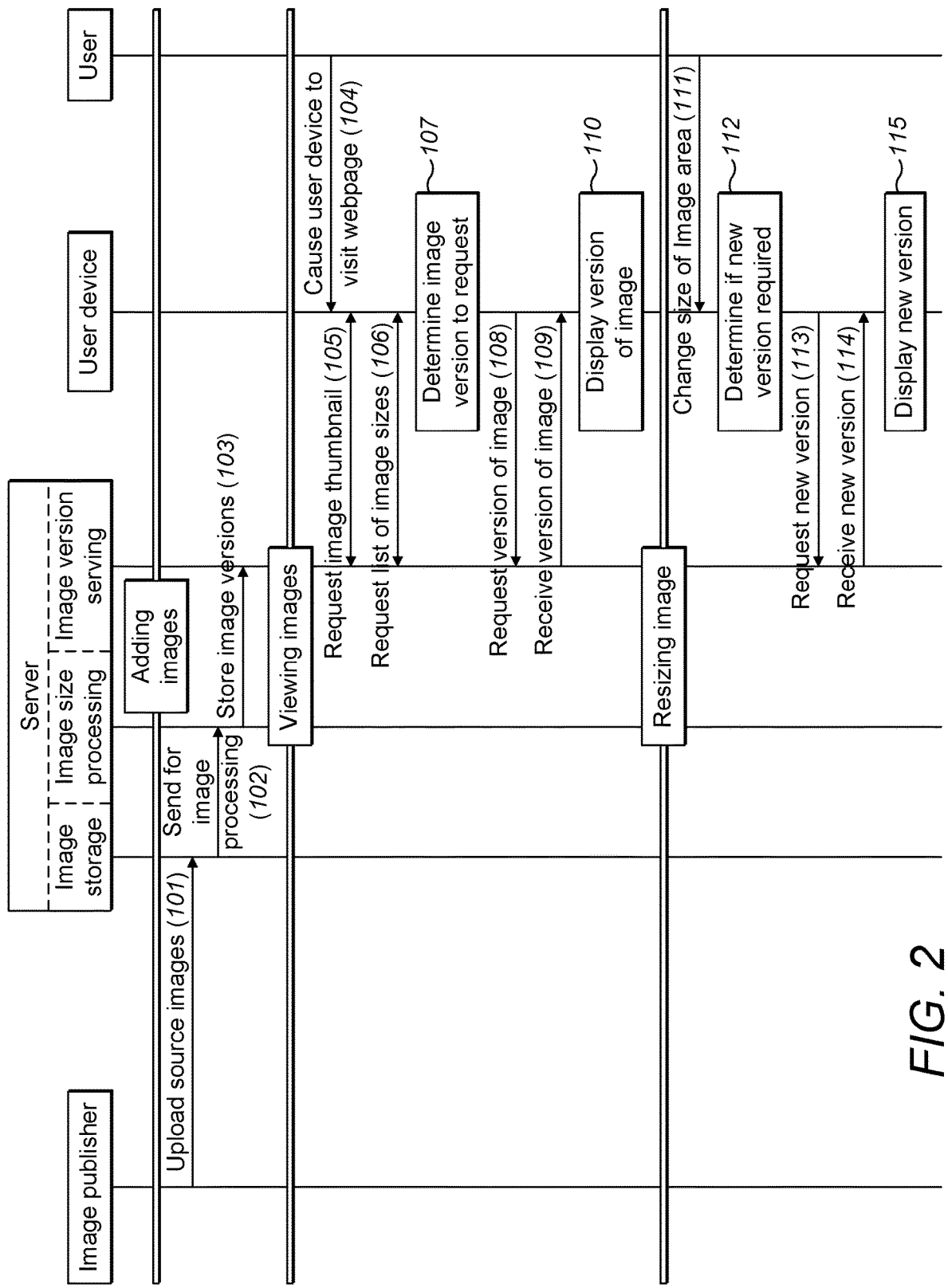
FIG. 2 shows a flow diagram of the process for optimised delivery of image files.

The optimised storage, transmission and display of images will now be described with reference to the figures. FIG. 2 shows a flow diagram of the methods that can be used to optimise the delivery and display of an image in a display area of a device. It will be appreciated that although a number of steps are shown in the flow diagram in FIG. 2 in series at least some of those steps are optional and other steps may be implemented whilst omitting those optional steps. In addition, certain steps may be undertaken separate from other steps, for instance the initial processing of images may happen separately from the providing of images to an end-user device.

As shown in 101, a user may upload at least one image to the server 1. The image uploaded can be seen as an original image and will generally be a high-resolution version. It may also have little compression to ensure that the quality of the image is high. This original image can be stored by server 1 in storage location 3.

As shown in 102, the uploaded images are sent for image size processing by an image resizing process. The process of sending the images for image size processing may involve the server 1 requesting that the image resizing process running on server 1 initiate the image size processing described herein. Alternatively, server 1 may transmit a request to a second server running the image resizing process to initiate image size processing. The request may include a reference to where the images are stored or the images may be sent to the second server. It should be taken that any future reference to the server could be taken to mean server 1 or the second server if such as server is present in the system.

Image size processing comprises processing the original image and creating a plurality of versions of the image. Each version of the image has a respective image size meaning that the image has a defined width and height measured by the number of pixels in each direction. The original image is processes into the plurality of versions by resizing the original image into a plurality of versions of the image that have defined image widths. The image widths can be selected based on a determined use-case for the image. This use-case may have been supplied by the user when the image was uploaded. Alternatively, the image widths can be selected based on statistical data associated with previous images that have been processed by the image resizing process. Image size processing may also optimise each version of the image that is created so that a quality factor is selected for each version of the image that uses the lowest quality factor possible without introducing visible image compression artefacts into the image. The quality factor may comprise the compression ratio of the image.

Image size processing may also comprise the creation of an image thumbnail for the original image. This image thumbnail is relatively small in size compared to both the original image and the versions of the image that are created by the image resizing process. The image thumbnail may be a sub-10 Kb file. The image thumbnail may include basic image information about the original image (and versions of the image) such as metadata, aspect ratio, and a minimal thumbnail image of the original image. This image thumbnail can be used later on in the process to render a low-resolution placeholder of the image whilst a selected version of the image is collected from the server 1.

Once the image size processing is complete, the versions of the image (together with the image thumbnail—if created) can be made available for request and download by the end user, as shown at 103. The images may be made available by one of server 1 or second server. Alternatively, the image versions may be transmitted to a third server which is configured to deliver those images to end users. For instance, the third server may be connected to network 6 in a manner that permits external access to that server. I.e. it may be a web application server.

Other image processing may be undertaken on the image versions before they are made available for access by the end user. For instance, the image versions may be scrambled so that unauthorised access is prevented or at least inhibited. The image scrambling and unscrambling may be undertaken using the methods described in WO2017/051152, the technical description of which are incorporated by reference where permitted by law although the present application should be interpreted without reference to this document.

As shown in 104, a user controls a user device to visit a webpage using an internet browser that contains browser executable code that is configured to display an image within a display area. The image may be to be displayed in an image area of the display area. The visiting of the webpage comprises the user device requesting data from server 1

The browser executable code is interpreted by the internet browser 17 which causes the user device to request the image thumbnail associated with the image from server 1. This is as shown by 105. The server 1 sends the image thumbnail to the user device and the internet browser 17 displays the image thumbnail in the display area 18 once it has been received by the user device. The image thumbnail is displayed with the image size (i.e. filling the image area) that the version of the image will be display with once the version of the image has been downloaded. By downloading and displaying the image thumbnail in the image area that would be occupied by the version of the image that is still to be received by the user device, the browser executable code can cause the image area that will be filled by the image version to be filled by something that looks like the final image practically immediately. This reduces perceived image download latency by taking up the webpage height quickly whilst the final image continues to load.

Whilst the user device is requesting and displaying the image thumbnail, the user device may also interrogate the server 1 for the image sizes of the versions of the image that are available. Thus, the device may request a list of the image sizes of the versions of the image that are available. This is as shown by 106. Alternatively, the browser executable code may already have the list of image sizes for the versions of the image written into it. In this case, the user device will already have a list of the image sizes and so not need to contact the server 1 for this information.

As shown in 107, the user device determines a first version of the image to request from the server. The determination may be made by the browser interpreting the browser executable code. The first version of the image has a first image size. The user device determines which version of the image to request based on the pixel density of the display area where the image will be rendered. As discussed herein, the pixel density is the number of physical pixels of the display screen 12 that are used to display one logical pixel by the device 7, 8. The pixel density of the display area of the browser window may be further altered by the zoom level that the browser has been configured to show content at. Thus, the pixel density of the display area may be a combination of the pixel density of the display screen and the zoom level of the browser window. The user device may limit the pixel density value that is used in determining the first version of the image to request from the server to two. This is because if the pixel density value is greater than two then there is little or no perceptible change in image sharpness by increasing displayed image size beyond this value.

As discussed herein, the image is to be displayed in an image area. The user device can determine which version of the image to request based on a logical dimension of the image area. The logical dimension being the number of logical pixels along the dimension defined by the logical dimension. The logical dimension may be the logical width or the logical height of the image area. The logical width being the number of logical pixels required to display the image across the image area. The logical width can be the number of logical pixels across the horizontal (rather than vertical) dimension of the image display area. The logical height being the number of logical pixels required to display the image along the image area. The logical height can be the number of logical pixels along the vertical (rather than horizontal) dimension of the image display area.

The user device may determine a desired image dimension using the pixel density of the display area and the logical dimension of the image area. The user device may calculate a desired image dimension based on the pixel density of the display area and the logical dimension of the image area. The desired image dimension may be calculated by multiplying the pixel density of the display area by the logical dimension of the image area. If the logical width is used then the desired image dimension can be a desired image width and if the logical height is used then the desired image dimension can be a desired image height.

The desired image dimension is compared to the list of the image sizes of the versions of the image that are available from the server. The desired image dimension is compared to the same dimension present in the list of image sizes. If there is a version of the image that has an image size that matches the desired image dimension, then this version of the image is requested from the server 1.

If there is no version of the image that matches the desired image dimension, then a version of the image that has an image size that is greater than the desired image dimension is requested from the server 1. This version of the image can then be resized downward to fit the image area. The version of the image that is selected is greater than the desired image dimension by an amount that provides information sufficient for an anti-aliasing filter used for downsizing to have enough information to produce a downsized image that does not have artefacts. The version of the image that is selected may be larger than the desired image dimension by a predefined amount. The version of the image that is selected may be the next largest version of the image that is larger than the desired image dimension added to the predefined amount. This means that the amount of data needed to be transferred to send the image to the user device is minimised by only sending the next largest version of the image.

This predefined amount may be a fixed value or may be determined with reference to the desired image dimension. For instance, if the predefined amount is a fixed value it might be 50 px, 100 px, 150 px or 200 px. If the predefined amount is determined with reference to the desired image dimension the predefined amount may be a fraction of the desired image dimension. For instance, it might be 0.05, 0.1, 0.15, 0.2 or 0.25 times of the desired image dimension.

In a particularly advantageous embodiment, the predefined amount is calculated as the smaller of a fixed value or a fraction of the desired image size. The predefined amount may be calculated as the smaller of 50 px or 0.05 times the desired image dimension. The predefined amount may be calculated as the smaller of 100 px or 0.1 times the desired image dimension. The predefined amount may be calculated as the smaller of 150 px or 0.15 times the desired image dimension. The predefined amount may be calculated as the smaller of 200 px or 0.2 times the desired image dimension. The predefined amount may be calculated as the smaller of 250 px or 0.25 times the desired image dimension. For instance, the version of the image may be selected by selecting the smallest size from the $N_i$ versions of the image that contains sizes satisfying:

$$N_i > id + \min(fv, frac \cdot id)$$

where id is the desired image dimension, fv is the fixed value and frac is the factional value.

In the instance that the predefined amount may be calculated as the smaller of 200 px or 0.2 times the desired image dimension, the above equation would therefore be:

$$N_i > id + \min(200, 0.2 \cdot id)$$

This means that the image is scaled by a fractional amount to give some extra information to the scaling algorithm up to a maximum amount where the scaling algorithm is deemed to have enough extra information to work with irrespective of the total image size.

In addition to the determinations already described with reference to 107, the user device can determine which version of the image to request based on a determination of the device type and/or model of the user device. The user device may use the determination of the device type and/or model to apply a correction factor to the desired image dimension prior to selecting a version of the image.

The browser executable code may determine at least one device property associated with the device and determine a type and/or model of the user device based on the at least one device property. The device properties may comprise:
   The display resolution of the device.
   The pixel density of the display area.
   The user agent supplied by the internet browser. The user agent being a property supplied by the internet browser which identifies at least one of the make of internet browser, the operating system that the internet browser is being run on and/or the underlying browser processing engine.
   The operating system version.
   The internet browser type.
   Type and/or model of a GPU comprised within the user device.

The user device may use these device properties to determine a device type of the user device. The device type may comprise:
   Smartphone
   Tablet
   Laptop computer
   Desktop computer
   Smart TV The user device may use these device properties to determine a device model of the user device. The device model may comprise the manufacturer of the device and/or the specific model of the device.

The user device may determine the device type by comparing the determined device properties to known device properties associated with each of the device types. If the known device properties for a particular device type match the determined device properties then it can be determined that the user device has a particular device type. Similarly, the user device may determine the device model by comparing the device properties to known device properties for a particular device model. If the known device properties for a particular device model match the determined device properties then it can be determined that the user device has a particular device model. For instance, some smartphones have particular screen resolutions that are distinct from other devices. This may mean the device type can be determined and/or the particular device model.

The determination of the device type and/or device model means that an assumption can be made about the size of the display screen and/or the distance that the device is being viewed at. For instance, a smartphone's display screen is likely to be significantly smaller than that of a desktop computer. Therefore, the determination of the device type and/or device model may be used to determine that the user device is a handheld device.

The selection method described herein that selects an image based on the calculated desired image dimension using the pixel density of the display area and the logical dimension of the image area selects the image that has sufficient quality and resolution information to be acceptably displayed on a large screen. However, if the screen is small this amount of quality and resolution information is not necessarily required. Therefore, in response to a determination that the device type and/or device model is one of a group of small screen device types or models (i.e. a handheld device) then the user device may select a smaller image than the one determined above. The version of the image that is selected may be the next smallest version of the image that is smaller than the desired image dimension. The version of the image that is selected may be multiple versions smaller than the desired image dimension.

The user device may select a smaller image by applying a scaling factor to the desired image dimension. The scaling factor may cause the desired image dimension to become smaller. This means that a smaller version of the image will be selected than would otherwise be selected using the method described above. The scaling factor may be between 1:1 and 2:1. I.e. scaling the selected image down to half the size it would otherwise be.

As shown at 108, once the user device has determined the version of the image to request, it requests this version of the image from server 1. The requesting may be made by the browser interpreting the browser executable code. The request may include an identifier for the image and the size of version that is required. The request may include an identifier that is specific to that version of the image.

As shown at 109, the user device receives the version of the image from server 1. The receiving may be made by the browser running on the user device.

As shown at 110, the user device displays the version of the image within the display area. The displaying may be done by the browser interpreting the browser executable code. The version of the image may be displayed in the area of the display area defined by the image area. The displaying may be done by the browser rendering the version of the image to a virtual layer within the display area of the browser window. The displaying may be done by the browser rendering the version of the image to a canvas layer within the display area of the browser window. A canvas layer may be as defined by the HTML5 standard. The version of image is displayed within the display area using the logical pixels so that the version of the image fills the image area.

Other image processing may be undertaken on the image versions before they are displayed in the display area. For instance, the image versions may be scrambled so that unauthorised access is prevented or at least inhibited. Therefore, the image version may need to be unscrambled by the browser executable code prior to display in the display area. As described herein, the image scrambling and unscrambling may be undertaken using the methods described in WO2017/051152.

There may be some actions that are taken by the user which means that a new version of the image should be displayed in the display area instead of the currently displayed version of the image. This could be because the image area has grown in size and so the low-resolution image that was initially requested is no longer suitable for display and a higher resolution image is now required. As shown at 111, the user undertakes an action that changes the size of the image area.

As shown by 112, the user device, by running the browser executable code, determines whether the change in size of the image area means that a new version of the image should be requested. If after the change in size, the image area is equal to or less than the image size of the current version of the image then no new version of the image is requested. The current version of the image is merely resized to fit the new size of image area. If after the change in size, the image area is greater than the image size of the current version of the image then the user device determines which version of the image to request using the steps outlined with reference to 106. The device then requests the image as outlined with reference to 107 and shown at 113, receives it as outlined with reference to 108 and shown at 114 and displays it as outlined with reference to 109 and shown at 115.

The method herein described are advantageous because an optimised size of a version of the desired image is downloaded at a given time. The size is selected so that the fact that lower quality/smaller version of the image is downloaded is not perceptible to the end user whilst decreasing download time and the amount of data needed to download the image.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method for the display of an image in an image area of a display area of a display screen, the image area having a logical dimension being the number of logical pixels across a horizontal or vertical dimension of the image area, the display area having a pixel density, the image being stored on a server in a plurality of versions, and each version of the image having a respective image size, the method comprising:
   detecting the pixel density of the display area, the pixel density being the number of physical pixels of the display area of the display screen that are used to display one logical pixel;
   calculating a desired image dimension by multiplying the pixel density of the display area by the logical dimension of the image area;
   determining a first version of the image to request from the server based on the desired image dimension, the first version of the image having a first image size;
   requesting the first version of the image;
   receiving the first version of the image;
   displaying the first version of the image in the display area; and
   calculating a predefined amount as the smaller value of a fixed value and a fraction of the desired image dimension,
   wherein:
      the determining of the first version of the image to request from the server comprises selecting, from the plurality of versions of the image, a version of the image:
         such that the first image size has an image dimension greater than the desired image dimension by the predefined amount; and
         that is the next largest version of the image that is larger than the desired image dimension added to the predefined amount; and
      displaying the first version of the image in the display area comprises resizing the first version of the image to fit the image area.

2. The method according to claim 1, wherein the image is displayed in the image area of the display area, and the method comprises:
   determining a change in size of the image area to a new size of the image area which is; and
   when the new size of the image area is equal to or less than the first image size, resizing the first version of the image to the new size of the image area.

3. The method according to claim 1, wherein a user device comprises the display area and determining a first version of the image to request from the server comprises determining a device model and/or device type for the user device and determining a first version of the image to request from the server based on the device model and/or device type.

4. The method according to claim 3, wherein determining a first version of the image to request from the server based on the device model and/or device type comprises applying a scaling factor to the desired image dimension, and determining a first version of the image to request from the server based on the scaled desired image dimension.

5. The method according to claim 1, wherein the image is processed into the plurality of versions by resizing the image into a plurality of versions of the image that have defined image widths.

6. The method according to claim 5, wherein the image widths are selected based on a determined use-case for the image supplied by a user.

7. The method according to claim 1, wherein the image is displayed in the image area of the display area, and the method comprises:
 determining a change in size of the image area to a new size of the image area; and
 when the new size of the image area is greater than the first image size, determining a second version of the image to request from the server based on the pixel density of the display area, the second version of the image having a second image size.

8. The method of claim 1, wherein the display area is the area of a browser window, and the pixel density of the display area is further altered by the zoom level of the browser window.

9. A non-transitory computer readable medium comprising browser executable code configured to cause a browser to implement a method for the display of an image in an image area of a display area of the browser, the image area having a logical dimension being the number of logical pixels across a horizontal or vertical dimension of the image area, the display area having a pixel density, the image being stored on a server in a plurality of versions, and each version of the image having a respective image size, the method comprising:
 detecting the pixel density of the display area, the pixel density being the number of physical pixels of the display area of the browser that are used to display one logical pixel;
 calculating a desired image dimension by multiplying the pixel density of the display area by the logical dimension of the image area;
 determining a first version of the image to request from the server based on the desired image dimension, the first version of the image having a first image size;
 requesting the first version of the image;
 receiving the first version of the image;
 displaying the first version of the image in the display area; and
 calculating a predefined amount as the smaller value of a fixed value and a fraction of the desired image dimension,
 wherein:
  determining the first version of the image to request from the server comprises selecting, from the plurality of versions of the image, a version of the image:
   such that the first image size has an image dimension greater than the desired image dimension; and
   that is the next largest version of the image that is larger than the desired image dimension added to the predefined amount; and
  displaying the first version of the image in the display area comprises resizing the first version of the image to fit the image area.

10. The computer readable medium according to claim 9, wherein the desired image dimension is a first desired image dimension and the method further comprises:
 determining a change in size of the image area to a new size of the image area which is greater than the first image size;
 calculating a second desired image dimension by multiplying the pixel density of the display area by the logical dimension of the image area; and
 determining a second version of the image to request from the server based on the second desired image dimension, the second version of the image having a second image size.

11. The computer readable medium of claim 10, wherein the second version of the image to request from the server is determined after the first version of the image is displayed in the display area.

12. The computer readable medium of claim 10, wherein determining the change in size of the image area to the new size of the image area comprises detecting the change in size of the image area.

13. The computer readable medium of claim 9, wherein the pixel density of the display area is a combination of the pixel density of the display screen and the zoom level of the browser.

* * * * *